United States Patent
Wang et al.

(10) Patent No.: US 11,076,423 B2
(45) Date of Patent: Jul. 27, 2021

(54) APPARATUSES AND METHODS FOR COMMUNICATING IN A WIRELESS COMMUNICATION NETWORK

(71) Applicant: Telefonaktiebolaget LM Ericsson (publ), Stockholm (SE)

(72) Inventors: Yu Wang, Solna (SE); Parth Amin, St. Albans (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 21 days.

(21) Appl. No.: 16/624,890

(22) PCT Filed: Jun. 20, 2017

(86) PCT No.: PCT/SE2017/050679
§ 371 (c)(1),
(2) Date: Dec. 19, 2019

(87) PCT Pub. No.: WO2018/236258
PCT Pub. Date: Dec. 27, 2018

(65) Prior Publication Data
US 2020/0137795 A1  Apr. 30, 2020

(51) Int. Cl.
*H04W 4/00* (2018.01)
*H04W 74/06* (2009.01)
(Continued)

(52) U.S. Cl.
CPC ........... *H04W 74/06* (2013.01); *H04L 5/0007* (2013.01); *H04L 5/0044* (2013.01);
(Continued)

(58) Field of Classification Search
CPC .... H04W 74/06; H04W 80/02; H04L 5/0007; H04L 5/0044; H04L 5/0048; H04L 5/0094
(Continued)

(56) References Cited

U.S. PATENT DOCUMENTS

2002/0006136 A1\* 1/2002 Mallory ................ H04L 1/1809
370/466
2006/0203841 A1 9/2006 Fischer
(Continued)

FOREIGN PATENT DOCUMENTS

WO    2016032195 A1    3/2016

OTHER PUBLICATIONS

International Search Report and Written Opinion for International Application No. PCT/SE2017/050679, dated Apr. 27, 2018, 12 pages.
(Continued)

*Primary Examiner* — Thai D Hoang
(74) *Attorney, Agent, or Firm* — NDWE LLP

(57) ABSTRACT

A method and an access node for communicating in a wireless communication network, the method comprising at an access node obtaining a timing indicator; transmitting to at least one communication device a first frame sequence. The first frame sequence comprises a first portion comprising a first preamble associated with a first communication protocol, a second portion comprising a first polling frame associated with the first communication protocol, and a third portion comprising a second preamble followed by a second polling frame, the second preamble and second polling frame are associated with a second communication protocol. The third portion is multiplexed in the frequency domain with the second portion. The method further comprises providing to the at least one communication device the timing indicator for enabling the access node to control a time of reception of a first portion of a subsequent second frame sequence.

26 Claims, 8 Drawing Sheets

(51) Int. Cl.
*H04L 5/00* (2006.01)
*H04W 80/02* (2009.01)

(52) U.S. Cl.
CPC .......... *H04L 5/0048* (2013.01); *H04L 5/0094* (2013.01); *H04W 80/02* (2013.01)

(58) Field of Classification Search
USPC .................................. 370/329–330, 335–345
See application file for complete search history.

(56) References Cited

U.S. PATENT DOCUMENTS

| | | | |
|---|---|---|---|
| 2014/0211704 A1 | 7/2014 | Sampath et al. | |
| 2014/0307612 A1 | 10/2014 | Vermani et al. | |
| 2015/0381394 A1* | 12/2015 | Zhang | H04L 1/0046 375/260 |
| 2016/0080186 A1* | 3/2016 | Porat | H04L 27/2602 375/260 |
| 2016/0242177 A1 | 8/2016 | Seok | |
| 2017/0142721 A1 | 5/2017 | Azizi et al. | |
| 2017/0170932 A1 | 6/2017 | Chu et al. | |
| 2018/0062899 A1* | 3/2018 | Zhang | H04L 1/0042 |
| 2018/0352055 A1* | 12/2018 | He | H04L 1/0084 |
| 2019/0268449 A1* | 8/2019 | Zhang | H04L 27/2602 |

OTHER PUBLICATIONS

Communication pursuant to Article 94(3) EPC, EP App. No. 17914980.2, Dec. 8, 2020, 6 pages.

International Preliminary Report on Patentability for International Application No. PCT/SE2017/050679, dated Dec. 24, 2019, 7 pages.

Supplementary European Search Report, EP App. No. 17914980.2, Nov. 26, 2020, 4 pages.

Decision to Grant for JP Application No. 2019-569804, dated Apr. 16, 2021, 5 pages.

* cited by examiner

APPARATUSES AND METHODS FOR COMMUNICATING IN A WIRELESS COMMUNICATION NETWORK

CROSS-REFERENCE TO RELATED APPLICATIONS

This application is a National stage of International Application No. PCT/SE2017/050679, filed Jun. 20, 2017, which is hereby incorporated by reference.

TECHNICAL FIELD

Embodiments herein relate to an access node, a communication device and methods performed therein for communication. Furthermore, computer programs, computer program products, and carriers are also provided herein. In particular, embodiments herein relate to communicating in a wireless communication network.

BACKGROUND

Wireless Local Area Networks (WLANs) typically have a range up to 100 m and generally use unlicensed bandwidth spectrum. The IEEE 802.11 working group is responsible for developing WLAN standards and has to date produced approximately ten specifications since the first release of the legacy 802.11 protocol specification in 1997, to adapt to the evolving techniques and ever changing user demands.

IEEE is currently developing the IEEE 802.11ax specification, which provides significantly higher transmission rates than existing protocols. It has been agreed that the High Efficiency (HE) Physical Protocol Data Unit (PPDU) shall include the preamble of legacy protocol 802.11n/ac/b for backward compatibility reasons. IEEE 802.11ax will operate in the 2.4 and 5 GHz frequency band. Further developments are necessary, by e.g., allowing narrow band operations and also more power saving functions, to support Internet of Things (IoT) use cases.

Long Range Low Power (LRLP) WiFi was started as a new topic interest group within the IEEE 802.11 working group, addressing the specific needs of Machine-to-Machine (M2M) IoT, Energy Management, and Sensor applications, with the purpose of leveraging the mass-market WLAN infrastructure for reliable, consistent, and stable access to Internet and Cloud services, operating within the 2.4 GHz band.

The development of new communication protocols inevitably results in a mix of devices, supporting different protocols, being deployed. With the increasing number of devices transmitting wirelessly in the communication networks, there is a need for methods of communication providing efficient use of available bandwidth.

SUMMARY

An object of embodiments herein is to provide a mechanism for improving efficiency of the communication network.

This and other object are met by one or more embodiments disclosed herein.

According to a first aspect, there is provided a method for communicating in a wireless communication network. The method is performed by an access node and comprises obtaining a timing indicator. In a further action, the method comprises transmitting a first frame sequence to at least one communication device. The first frame sequence comprises a first portion, a second portion and a third portion. The first portion comprises a first preamble associated with a first communication protocol. The first portion is followed by the second portion which comprises a first polling frame associated with the first communication protocol. The first portion is also followed by the third portion which comprises a second preamble followed by a second polling frame. The second preamble and second polling frame are associated with a second communication protocol. The third portion and the second portion are multiplexed in the frequency domain. The method also comprises providing the obtained timing indicator to the at least one communication device for enabling the access node to control a time of reception of a first portion of a subsequent second frame sequence from the at least one communication device. The method also comprises receiving the first portion of the second frame sequence.

According to a second aspect, there is provided a method for communicating in a wireless communication network. The method is performed by a communication device and comprises receiving a first frame sequence from an access node. The frame sequence comprises a first portion, a second portion and a third portion. The first portion comprises a first preamble associated with a first communication protocol. The first portion is followed by the second portion which comprises a first polling frame associated with the first communication protocol. The first portion is also followed by the third portion which comprises a second preamble followed by a second polling frame. The second preamble and the second polling frame are associated with a second communication protocol. The third portion is multiplexed in the frequency domain with the second portion. The method also comprises decoding one of the first portion and the third portion of the first frame sequence. The method also comprises obtaining a timing indicator from the access node. The method also comprises determining a time of transmission of a first portion of a subsequent second frame sequence based on the timing indicator and transmitting the first portion of the second frame sequence at the determined time to the access node.

According to a third aspect, there is provided an access node for communicating in a wireless communication network. The access node is configured to obtain a timing indicator and transmit a first frame sequence to at least one communication device. The frame sequence comprises a first portion, a second portion and a third portion. The first portion comprises a first preamble associated with a first communication protocol. The first portion is followed by the second portion which comprises a first polling frame associated with the first communication protocol. The first portion is also followed by the third portion which comprises a second preamble followed by a second polling frame. The second preamble and the second polling frame are associated with a second communication protocol. The third portion is multiplexed in the frequency domain with the second portion. The access node is also configured to provide the timing indicator to the at least one communication device for enabling the access node to control a time of reception of a first portion of a second frame sequence from the at least one communication device. The access node is also configured to receive the first portion of the second frame sequence.

According to a fourth aspect, there is provided a communication device for communicating in a wireless communication network. The communication device is configured to receive a first frame sequence from an access node. The first frame sequence comprises a first portion, a second portion and third portion. The first portion comprises a first preamble associated with a first communication protocol and is followed by the second portion which comprises a first polling frame associated with the first communication protocol. The first portion is also followed by a third portion which comprises a second preamble followed by a second polling frame. The second preamble and the second polling frame are associated with a second communication protocol. The third portion is multiplexed in the frequency domain with the second portion. The communication device is also configured to decode one of the first portion and the second portion of the first frame sequence. The communication device is also configured to obtain a timing indicator from the access node. The communication device is also configured to determine a time of transmission of a first portion of a second frame sequence based on the timing indicator and transmit the first portion of the second frame sequence at the determined time to the access node.

According to a fifth aspect, there is provided an access node for communicating in a wireless communication network. The access node comprises an obtaining module for obtaining a timing indicator and a transmitting module for transmitting a first frame sequence to at least one communication device. The frame sequence comprises a first portion, a second portion and a third portion. The first portion comprises a first preamble associated with a first communication protocol. The first portion is followed by the second portion which comprises a first polling frame associated with the first communication protocol. The first portion is also followed by the third portion which comprises a second preamble followed by a second polling frame. The second preamble and the second polling frame are associated with a second communication protocol. The third portion is multiplexed in the frequency domain with the second portion. The access node also comprises a providing module for providing the timing indicator to the at least one communication device for enabling the access node to control a time of reception of a first portion of a second frame sequence from the at least one communication device. The access node also comprises a receiving module for receiving the first portion of the second frame sequence.

According to a sixth aspect, there is provided a communication device for communicating in a wireless communication network. The communication device comprises a receiving module for receiving a first frame sequence from an access node. The first frame sequence comprises a first portion, a second portion and third portion. The first portion comprises a first preamble associated with a first communication protocol and is followed by the second portion which comprises a first polling frame associated with the first communication protocol. The first portion is also followed by a third portion which comprises a second preamble followed by a second polling frame. The second preamble and the second polling frame are associated with a second communication protocol. The third portion is multiplexed in the frequency domain with the second portion. The communication device also comprises a decoding module for decoding one of the first portion and the second portion of the first frame sequence. The communication device also comprises an obtaining module for obtaining a timing indicator from the access node. The communication device also comprises a determining module for determining a time of transmission of a first portion of a second frame sequence based on the timing indicator and transmit the first portion of the second frame sequence at the determined time to the access node.

According to a seventh aspect, there is provided a computer program comprising instructions, which when executed on at least one processor, cause the processor to perform the corresponding method according to any of the first and the second aspect.

According to an eighth aspect there is provided a computer program product comprising a computer-readable medium having stored thereon a computer program of the seventh aspect.

According to a ninth aspects, there are provided a carrier comprising the computer program according to the seventh aspect. The carrier is one of an electronic signal, an optical signal, an electromagnetic signal, a magnetic signal, an electric signal, a radio signal, a microwave signal, or a computer-readable storage medium.

Disclosed herein are methods to improve performance for communicating wirelessly with devices in e.g. Internet of Things. The methods allow the network bandwidth and the limited resources of e.g. constrained networks to be used more efficiently. In particular, embodiments herein relate to transmitting frame sequences comprising portions associated with different communication protocols, that are multiplexed in the frequency domain, avoiding unnecessary padding. Embodiments herein thus enable that communication from an access node to a communication device is subject to less interference, providing advantages, such as, more efficient use of frequency spectrum and reduced resending of messages. This leads to an efficient handling of communication in the communication network, which may further result in an improved performance of the communication network, less power consumption of devices and nodes of the communication network, for example.

BRIEF DESCRIPTION OF THE DRAWINGS

In the following, embodiments and exemplary aspects of the present disclosure will be described in more detail with reference to the drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

In the following description, explanations given with respect to one aspect of the present disclosure correspondingly apply to the other aspects.

Figure 1:
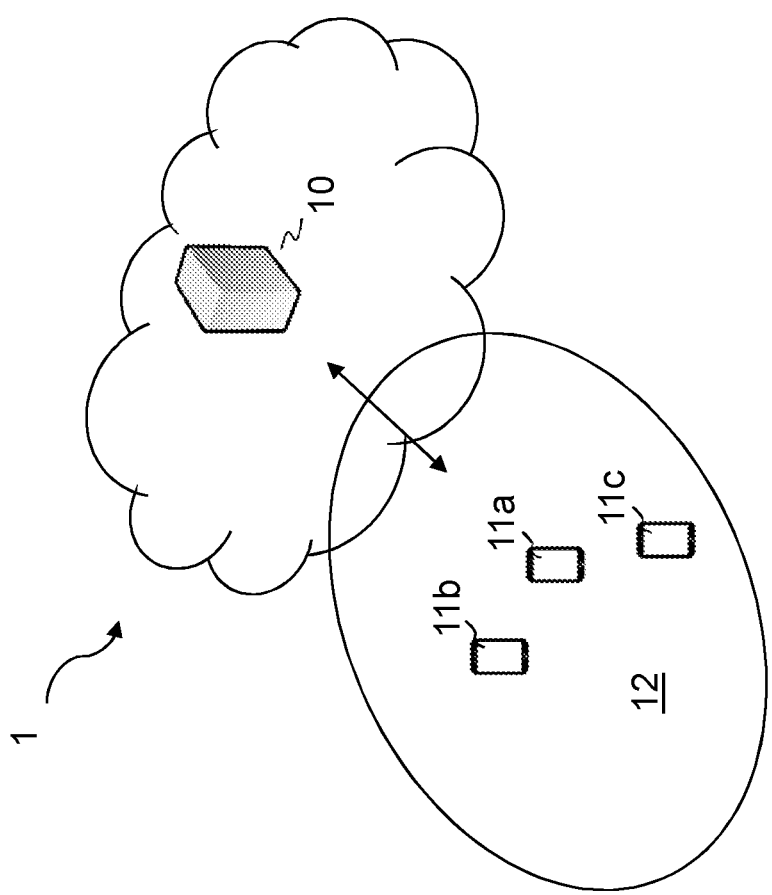
FIG. 1 is a schematic overview depicting a wireless communication network according to some embodiments herein.

FIG. 1 is a schematic overview depicting a wireless communication network 1 in which embodiments according to the present teachings may be implemented. The communication network 1 may use a number of different technologies, such as Wi-Fi, Bluetooth Low Energy, ZigBee, LoRA, just to mention a few possible implementations.

The communication network 1 comprises an access node 10 such as a Wireless Local Area Network (WLAN) access point, a stand-alone access point or any other network unit capable of providing a communication device 11a, 11b, 11c within a service area 12 access to the communication network 1. It will be appreciated that the communication network 1 comprises additional components not illustrated in FIG. 1.

In the service area 12 communication devices 11a, 11b, 11c, e.g., communication devices such as M2M devices, wireless devices, user equipments and/or wireless terminals, communicate with one another or the communication network 1. It should be understood by those skilled in the art that "communication device" is a non-limiting term which means any terminal, communication terminal, user equipment, Machine Type Communication (MTC) device, Device to Device (D2D) terminal, or node, e.g., smart phone, laptop, mobile phone, sensor, relay, mobile tablets or any device communicating within a service area 12. The communication device may be referred to as a first endpoint or a client.

As discussed above, communication devices 11a, 11b, 11c may be using older or more recent communication protocols, which puts certain demands on the access node 10, one obviously being the ability to decode two or more communication protocols.

Embodiments herein relate to handling transmission and reception of frame sequences of, e.g., a dual mode access node 10. Embodiments herein enable that portions of frames in a sequence may be multiplexed in a manner for efficient use of network resources.

In a particular embodiment, the communication device is a wireless device (WD), referring herein to a device capable, configured, arranged and/or operable to communicate wirelessly with network nodes and/or other wireless devices. Communicating wirelessly may involve transmitting and/or receiving wireless signals using electromagnetic signals, radio waves, infrared signals, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, user equipment (UE), smart phone, mobile phone, cell phone, voice over IP (VoIP) phone, wireless local loop phone, desktop computer, personal digital assistant (PDA), wireless cameras, gaming terminal devices, music storage, playback appliances, wearable terminal devices, wireless endpoints, mobile stations, tablets, laptops, laptop-embedded equipment (LEE), laptop-mounted equipment (LME), smart devices, wireless customer-premise equipment (CPE) and vehicle-mounted wireless terminal devices. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

Figure 2:
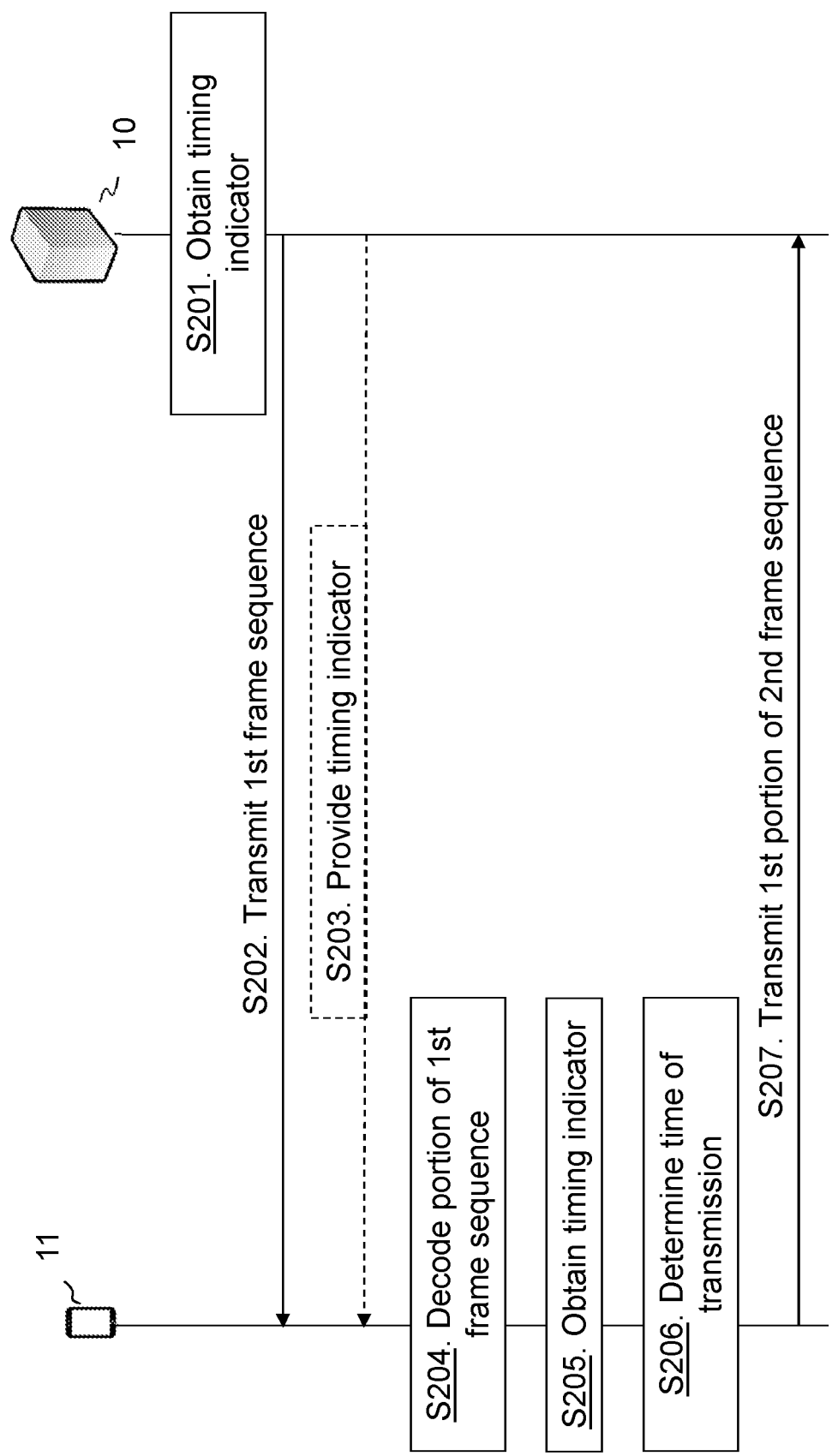
FIG. 2 is a combined flowchart and signalling scheme according to certain embodiments herein.

FIG. 2 is a combined signaling scheme and flowchart according to embodiments herein. In Action S201, the access node 10, e.g. a wireless router, obtains a timing indicator. The timing indicator may be obtained by different mean as will be described below. In action S202, the access node 10 sends first frame sequence. The timing indicator obtained in Action S201 is in Action S203 provided to the communication device. The indicator may be for instance be including in the frame sequence or provided in other ways. In Action S204, the communication device 11 decodes a portion comprised in the first frame sequence transmitted from the access node 10. The communication device also obtains the timing indicator in Action S205, provided by the access node in Action S203, and determines in Action S206 a time of transmission of a first frame portion of a subsequent, second frame sequence, which is transmitted to the access node in Action S207.

Figure 3:
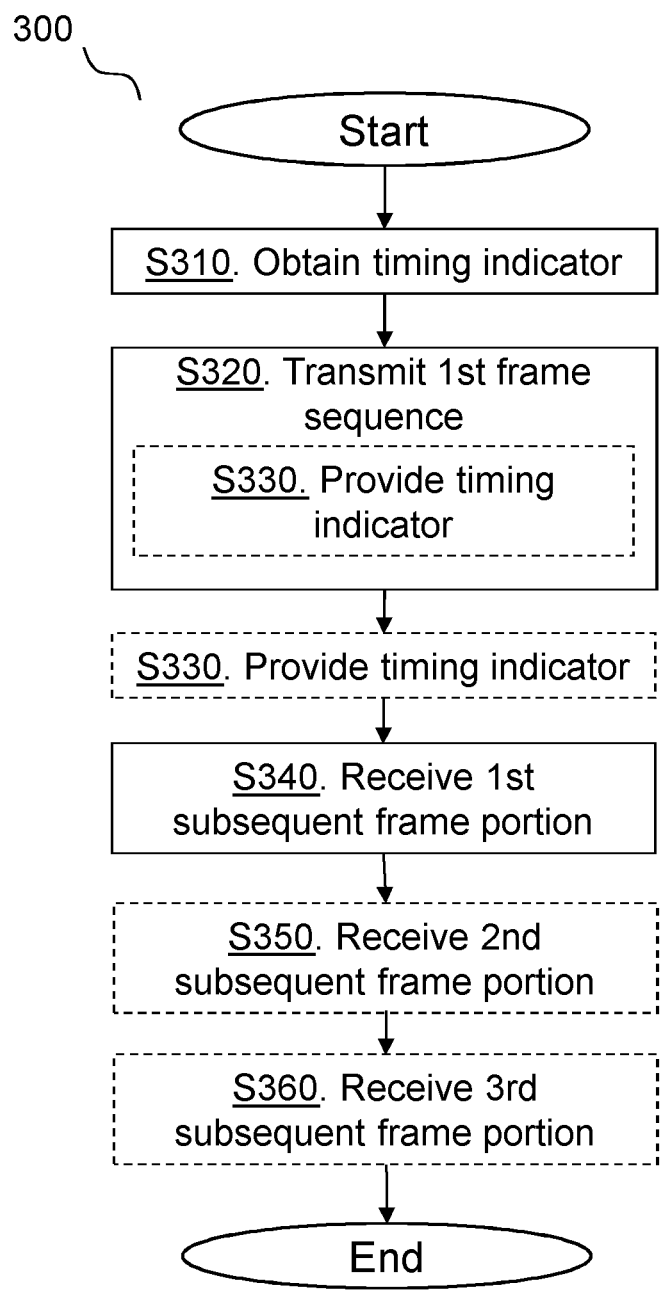
FIG. 3 is a flowchart depicting a method performed by an access node according to some embodiments herein.

The method according to some embodiments performed in an access node 10 will now be described in more detail. Referring to FIG. 3, in Action S310, the access node 10, e.g. a wireless router, obtains a timing indicator obtains a timing indicator. The timing indicator may be obtained by, for example, calculating an Inter Frame Space, IFS, based on a size of a preamble, a polling frame, and/or data to be transmitted. In Action S320, the access node 10 sends first frame sequence 500; 600 (see FIGS. 5 and 6). The first frame sequence comprises a first portion 510; 610, a second portion 515; 615 and a third portion 520; 620. The first portion 510; 610 comprises a first preamble 510a; 610a associated with a first communication protocol. This first portion is followed by the second portion and the third portion. The second portion 515; 615 comprises a first polling frame 515a; 615a, which is associated with the first communication protocol. The third portion 520; 620 of the first frame sequence, comprises a second preamble 520a; 620a followed by a second polling frame 520b; 620b, both being associated with a second communication protocol. Furthermore, the third portion 520; 620 is multiplexed in the frequency domain with the second portion 515; 615. The method also comprises providing in Action S330 the timing indicator to the at least one communication device for enabling the access node to control a time of reception $t_{adj}$ of a first portion 560; 670 of a subsequent second frame sequence 550; 650 from the at least one communication device. In Action S340 the access node receives the first portion 560; 670 of the second frame sequence 550; 650.

In one embodiment, of the method, the second portion 515; 615 of the first frame sequence consists of the first polling frame 515a; 615a.

In a further embodiment of the method, the timing indicator is provided within the first frame sequence 500; 600. The timing indicator may for instance be provided in a MAC header.

In an alternative embodiment, the timing indicator is provided in one of a payload of a control frame, or a payload of a management frame. That is, the timing indicator need not be provided in the first frame sequence.

In some embodiments, the timing indicator may, e.g., be a time duration or an index value to indicate one of several pre-indexed durations.

The method may in some embodiments further comprise in Action S340 receiving said first portion 560; 670 of the second frame sequence 550; 650 from a first communication device of the at least one communication device and the first portion 560; 670 of the second frame sequence 550; 650 comprising a third preamble 560a; 670a. The method may in this case further comprise Action S350, receiving a second portion 570; 660 of the second frame sequence 550; 650 comprising a fourth preamble 570a; 660a from a second communication device of the at least one communication device, and wherein the time of reception $t_{pre-c}$ of the second portion 570; 660 of the second frame sequence 550; 650 is controlled by a preconfigured value.

Further embodiments will now be explained with particular reference to the second frame structure 550 of FIG. 5. The first portion 560 of the second frame sequence 550 may be received prior to receiving the second portion 570 of the second frame sequence 550. Additionally, the third preamble 560a may be associated with the first communication protocol and the fourth preamble 570a may be associated with the second communication protocol. The method may further comprise that the second portion 570 of the second frame sequence 550 comprises user data 570b. The method may further comprise an Action 360 of receiving a third portion 565 of the second frame sequence 550 comprising user data 565a from the first communication device, and wherein the third portion 565 of the second frame sequence 550 is multiplexed with the second portion 570 of the second frame sequence (550) in the frequency domain.

In further embodiments will now be explained with particular reference to the second frame structure of FIG. 6.

The first portion 670 of the second frame sequence 650 may be received subsequently to receiving the second portion 660 of the second frame sequence 650. In this case, the third preamble 670a may be associated with the second communication protocol and the fourth preamble 660a is associated with the first communication protocol. Additionally, the method then comprise that the first portion 670 of the second frame sequence 650 comprises user data 670b. The method may also further comprise Action S360, receiving a third portion 665 of the second frame sequence 650 comprising user data 665a from the second communication device, and wherein the third portion 665 of the second frame sequence 650 is multiplexed with the first portion 670 of the second frame sequence 650 in the frequency domain.

The method according to some embodiments performed in a communication device 11 will now be described in more detail with reference to a flowchart depicted in FIG. 4A. The method 400 for communicating in a wireless communication network comprises in Action S410 receiving a first frame sequence 500; 600 from an access node. The first frame sequence 500; 600 comprises a first portion 510; 610 comprising a first preamble 510a; 610a associated with a first communication protocol. The first portion is followed by a second portion 515; 615 comprising a first polling frame 515a; 615a associated with the first communication protocol, and a third portion 520; 620 comprising a second preamble 520a; 620a followed by a second polling frame 520b; 620b, associated with a second communication protocol. The third portion 520; 620 is multiplexed in the frequency domain with the second portion 515; 615. In Action S420 the method comprises decoding one of the first portion 510; 610 and the third portion 520; 620 of the first frame sequence 500; 600. In Action S430 a timing indicator is obtained from the access node 10. Action S440 comprises determining a time of transmission of a first portion 560; 670 of a subsequent second frame sequence 550; 650 based on the timing indicator. In Action S450 the communication device transmits the first portion 560; 670 of the second frame sequence 550; 650 at the determined time to the access node.

In some embodiment of the method, obtaining, in Action S430, the timing indicator comprises extracting the timing indicator from the first frame sequence 500; 600. The timing indicator may for example be provided in a MAC header.

In an alternative embodiment obtaining, in Action S430, the timing indicator comprises extracting the timing indicator from one of a payload of a control frame, or a payload of a management frame.

Figure 5:
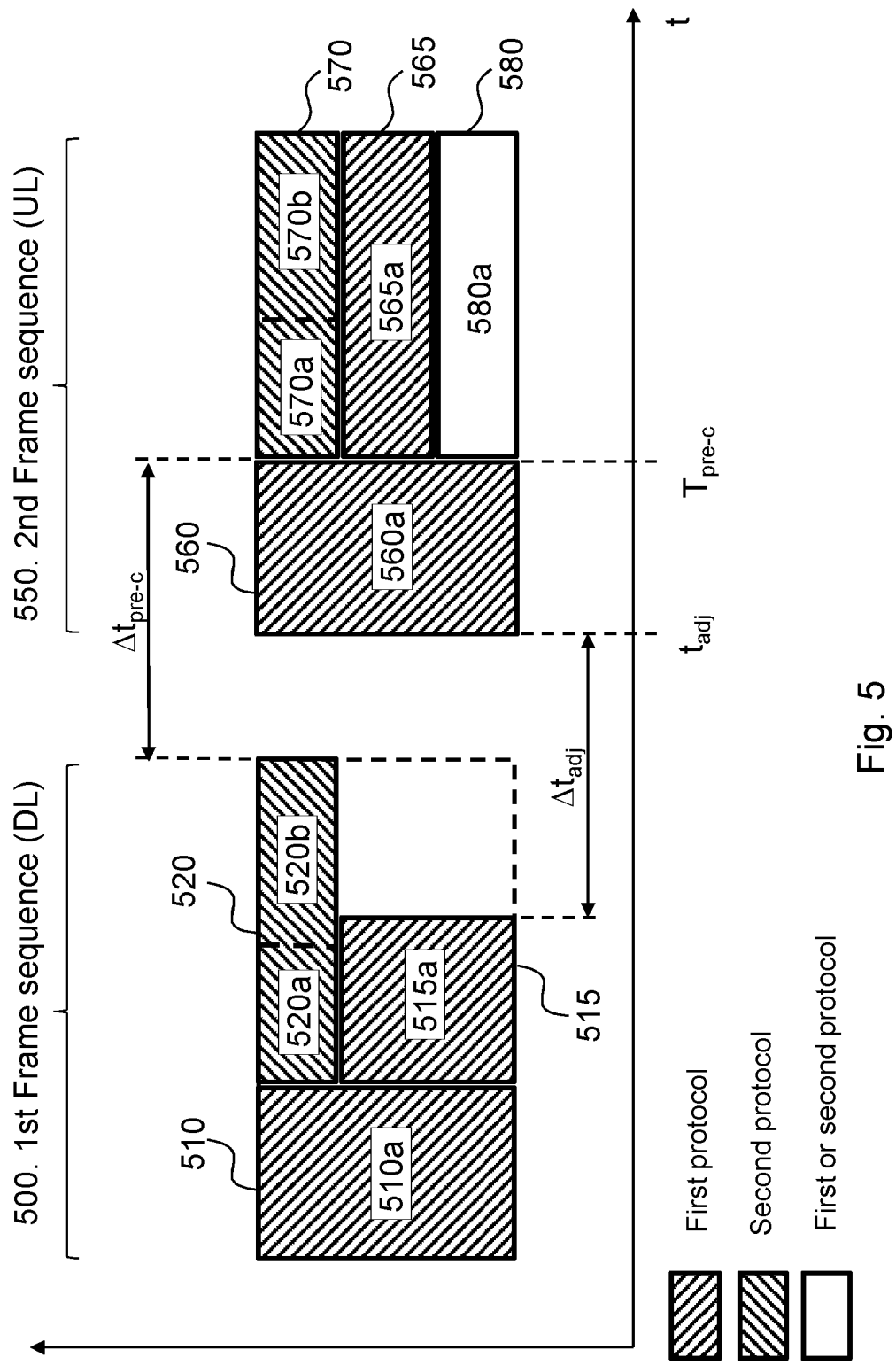
FIG. 5 depicts a frame sequences for transmissions in downlink and uplink directions according to an embodiment herein.

In some embodiments, particularly with reference to the frame sequence FIG. 5, the method in the communication device comprises that the first portion 560; 670 of the second frame sequence 550; 650 comprises a third preamble 560a; 670a. The method may then further comprise in Action S420, decoding the first portion 510 of the first frame sequence 500 and wherein the third preamble 560a is associated with the first communication protocol.

Figure 6:
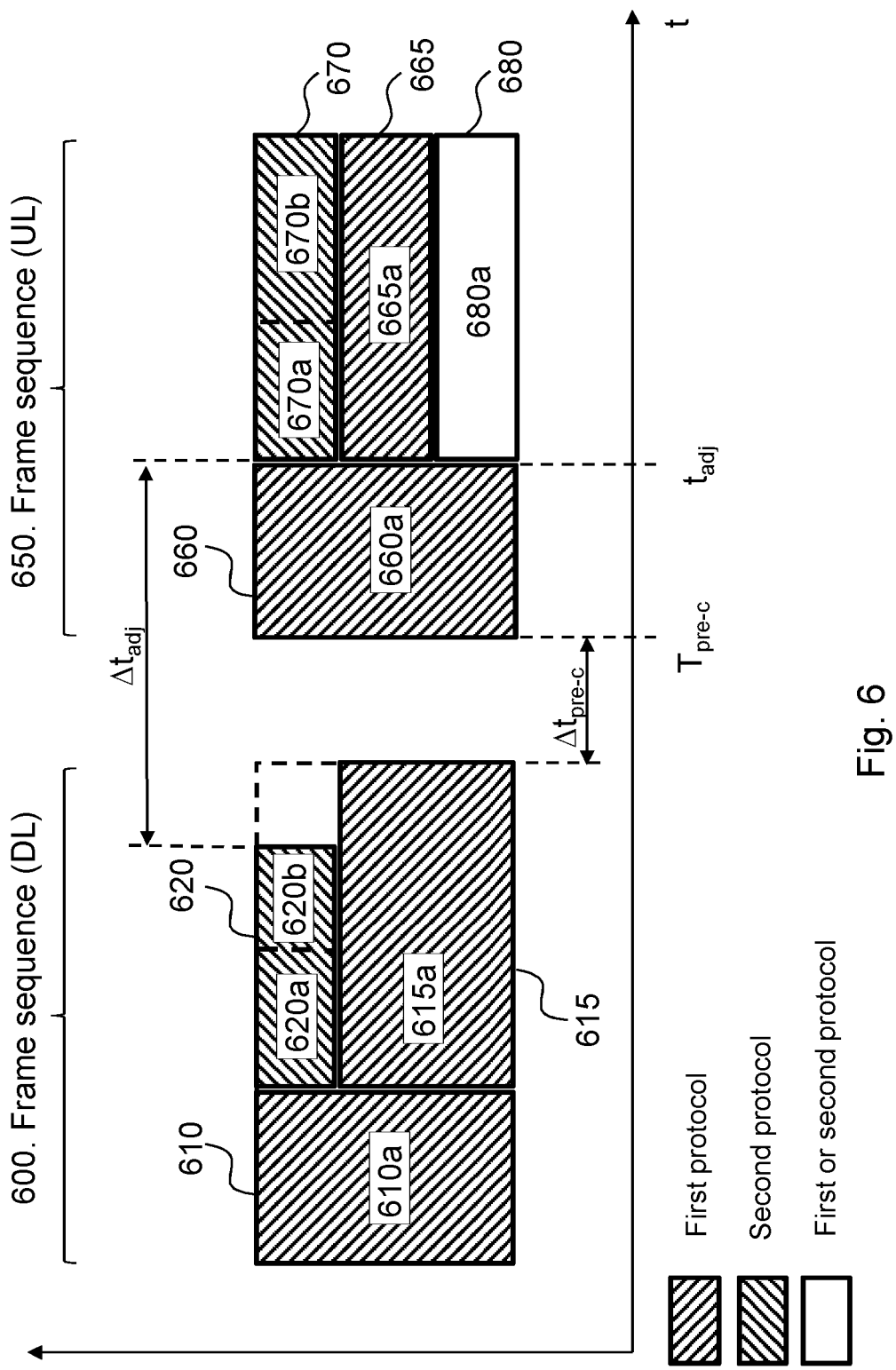
FIG. 6 depicts further frame sequences for transmissions in downlink and uplink directions according to another embodiment herein.

In some embodiments, particularly with reference to the frame sequence in FIG. 6, the Action S420 of the method comprises decoding the third portion 620 of the first frame sequence 600 and wherein the third preamble 670a is associated with the second communication protocol.

Figure 7A:
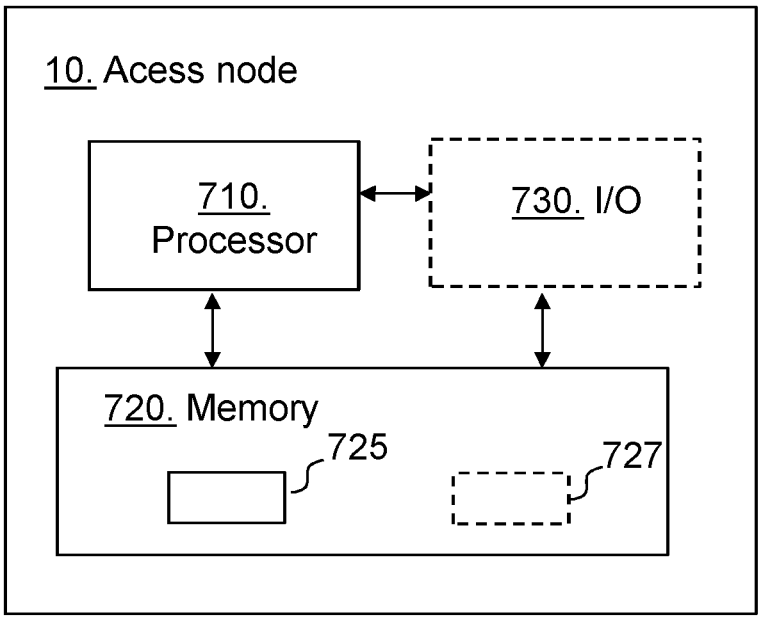
FIG. 7a illustrates schematically an access node and means for implementing some embodiments herein.

FIG. 7a is a schematic diagram illustrating an example of a computer implementation, in terms of functional units, the components of an access node 10 according to an embodiment. At least one processor 710 is provided using any combination of one or more of a suitable central processing unit (CPU), multiprocessor, microcontroller, digital signal processor (DSP), etc., capable of executing software instructions stored in a memory 720 comprised in the access node 10. The at least one processor 710 may further be provided as at least one application specific integrated circuit (ASIC), or field programmable gate array (FPGA).

Particularly, the at least one processor is configured to cause the access node 10 to perform a set of operations, or actions, S310-S340, as disclosed above. For example, the memory 720 may store the set of operations 725, and the at least one processor 710 may be configured to retrieve the set of operations 725 from the memory 720 to cause the access node 10 to perform the set of operations. The set of operations may be provided as a set of executable instructions. Thus the at least one processor 710 is thereby arranged to execute methods as herein disclosed.

The memory 720 may also comprise persistent storage 727, which, for example, can be any single one or combination of magnetic memory, optical memory, solid state memory or even remotely mounted memory.

Figure 8A:
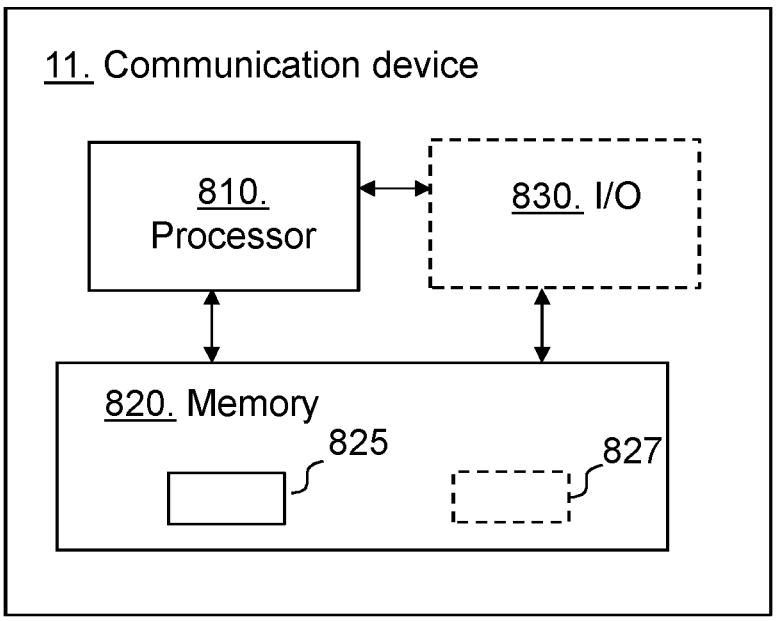
FIG. 8a illustrates schematically a communication device and means for implementing some embodiments of the method herein.

The access node 10 may further comprise an input/output device 730 for communications with a communication device 11 (as e.g. in FIG. 8a). As such the input/output device 730 may comprise one or more transmitters and receivers, comprising analogue and digital components and a suitable number of antennas for wireless communications and ports for wireline communications.

The at least one processor 710 controls the general operation of the access node 10 e.g. by sending data and control signals to the input/output device 730 and the memory 720, by receiving data and reports from the input/output device 730, and by retrieving data and instructions from the memory 720. Other components, as well as the related functionality, of the access node 10 are omitted in order not to obscure the concepts presented herein.

In this particular example, at least some of the steps, functions, procedures, modules and/or blocks described herein are implemented in a computer program 747, which is loaded into the memory 720 for execution by processing circuitry including one or more processors 710. The memory 720 may comprise, such as contain or store, the computer program 747. The processor(s) 710 and memory 720 are interconnected to each other to enable normal software execution. An input/output device 730 is also interconnected to the processor(s) 710 and/or the memory 720 to enable input and/or output of data and/or signals.

The term 'processor' should be interpreted in a general sense as any system or device capable of executing program code or computer program instructions to perform a particular processing, determining or computing task.

The processing circuitry does not have to be dedicated to only execute the above-described steps, functions, procedure and/or blocks, but may also execute other tasks.

Figure 7B:
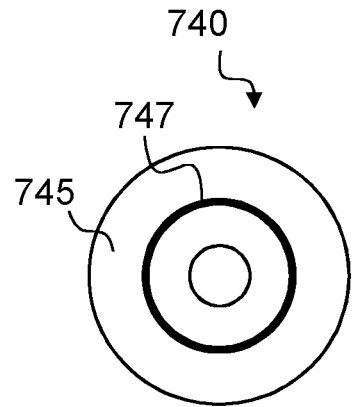
FIG. 7b illustrates schematically an example of a computer program product comprising computer readable means according to an embodiment herein.

FIG. 7b shows one example of a computer program product 740 comprising a computer readable storage medium 745, in particular a non-volatile medium. On this computer readable storage medium 745, a computer program 747 can be carried or stored. The computer program 747 can cause processing circuitry including at least one processor 710 and thereto operatively coupled entities and devices, such as the input/output device 730 and the memory 720, to execute methods according to embodiments described herein. The computer program 747 and/or computer program product 740 may thus provide means for performing any actions of the access node 10 as herein disclosed.

The flow diagram or diagrams presented herein may be regarded as a computer flow diagram or diagrams, when performed by one or more processors. A corresponding apparatus may be defined as a group of function modules, where each step performed by the processor 710 corresponds to a function module. In this case, the function modules are implemented as a computer program running on the processor 710.

The computer program residing in memory 720 may thus be organized as appropriate function modules configured to perform, when executed by the processor 710, at least part of the steps and/or tasks described herein.

Figure 7C:
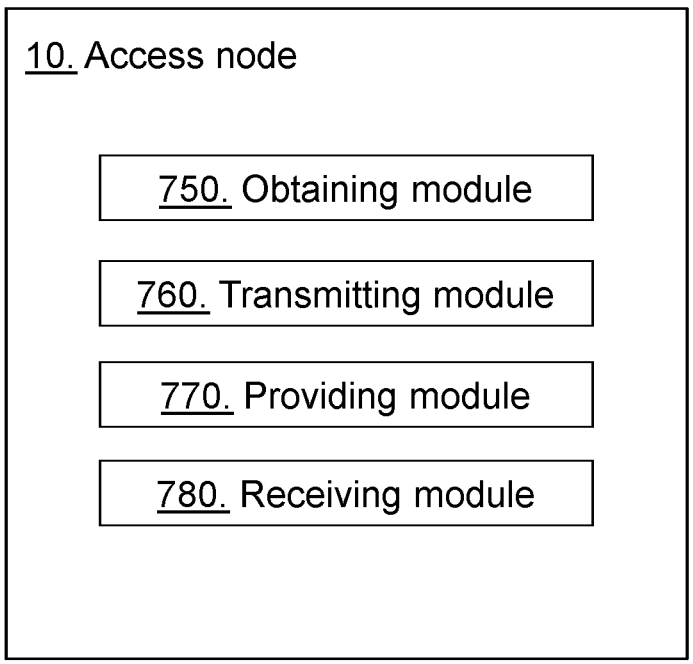
FIG. 7c illustrates schematically an access node comprising function modules/software for implementing an embodiment herein.

FIG. 7c is a schematic diagram illustrating an embodiment of the access node 10, in terms of a number of functional modules. The access node 10 comprises:

an obtaining module 750 for obtaining a timing indicator;

a transmitting module 760 for transmitting to at least one communication device 11 a first frame sequence comprising:

a first portion comprising a first preamble associated with a first communication protocol, followed by a second portion comprising a first polling frame associated with the first communication protocol, and a third portion comprising a second preamble followed by a second polling frame, associated with a second communication protocol, said third portion being multiplexed in the frequency domain with the second portion;

a providing module 770 for providing to the at least one communication device 11 the timing indicator for enabling the access node 10 to control a time of reception of a first portion of a second frame sequence from the at least one communication device 11; and a receiving module 780 for receiving the first portion of the second frame sequence.

In general terms, each functional module 750-780 may be implemented in hardware or in software. Preferably, one or more or all functional modules 750-780 may be implemented by processing circuitry including at least one processor 710, possibly in cooperation with functional units 720 and/or 730. The processing circuitry may thus be arranged to fetch from the memory 720 instructions as provided by a functional module 750-780 and to execute these instructions, thereby performing any actions of the access node 10 as disclosed herein.

Alternatively, it is possible to realize the module(s) in FIG. 7c predominantly by hardware modules, or alternatively by hardware, with suitable interconnections between relevant modules. Particular examples include one or more suitably configured processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending data and/or signals. The extent of software versus hardware is purely implementation selection.

FIG. 8a is a schematic diagram illustrating an example of a computer implementation, in terms of functional units, the components of a communication device 11 according to an embodiment. At least one processor 810 is provided using any combination of one or more of a suitable central processing unit (CPU), multiprocessor, microcontroller, digital signal processor (DSP), etc., capable of executing software instructions stored in a memory 720 comprised in the communication device 11. The at least one processor 810 may further be provided as at least one application specific integrated circuit (ASIC), or field programmable gate array (FPGA).

Particularly, the at least one processor is configured to cause the communications device 11 to perform a set of operations, or actions, S410-450, as disclosed above. For example, the memory 820 may store the set of operations 825, and the at least one processor 810 may be configured to retrieve the set of operations 825 from the memory 820 to cause the communications device 11 to perform the set of operations. The set of operations may be provided as a set of executable instructions. Thus the at least one processor 810 is thereby arranged to execute methods as herein disclosed.

The memory 820 may also comprise persistent storage 827, which, for example, can be any single one or combination of magnetic memory, optical memory, solid state memory or even remotely mounted memory.

The communications device 11 may further comprise an input/output device 830 for communications with an access node 10 (as e.g. in FIG. 7a). As such the input/output device 830 may comprise one or more transmitters and receivers, comprising analogue and digital components and a suitable number of antennas for wireless communications and ports for wireline communications.

The at least one processor 810 controls the general operation of the communications device 11 e.g. by sending data and control signals to the input/output device 830 and the memory 820, by receiving data and reports from the input/output device 830, and by retrieving data and instructions from the memory 820. Other components, as well as the related functionality, of the communications device 11 are omitted in order not to obscure the concepts presented herein.

In this particular example, at least some of the steps, functions, procedures, modules and/or blocks described herein are implemented in a computer program 837, which is loaded into the memory 820 for execution by processing circuitry including one or more processors 810. The memory 820 may comprise, such as contain or store, the computer program 837. The processor(s) 810 and memory 820 are interconnected to each other to enable normal software execution. An input/output device 830 is also interconnected to the processor(s) 810 and/or the memory 820 to enable input and/or output of data and/or signals.

The term 'processor' should be interpreted in a general sense as any system or device capable of executing program code or computer program instructions to perform a particular processing, determining or computing task.

The processing circuitry does not have to be dedicated to only execute the above-described steps, functions, procedure and/or blocks, but may also execute other tasks.

Figure 8B:
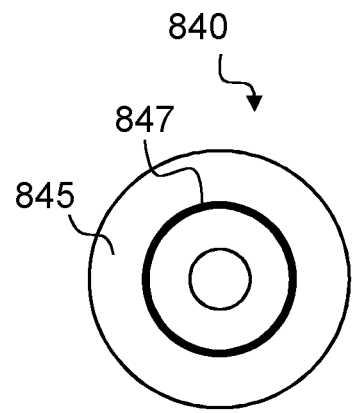
FIG. 8b illustrates schematically an example of a computer program product comprising computer readable means according to an embodiment herein.

FIG. 8b shows one example of a computer program product 840 comprising a computer readable storage medium 845, in particular a non-volatile medium. On this computer readable storage medium 845, a computer program 847 can be carried or stored. The computer program 847 can cause processing circuitry including at least one processor 810 and thereto operatively coupled entities and devices, such as the input/output device 830 and the memory 820, to execute methods according to embodiments described herein. The computer program 847 and/or computer program product 840 may thus provide means for performing any actions of the communication device 11 as herein disclosed.

In the example of FIGS. 7b and 8b, the computer program product 740; 840 is illustrated as an optical disc, such as a CD (compact disc) or a DVD (digital versatile disc) or a Blu-Ray disc. The computer program product 740; 840 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 747; 847 is here schematically shown as a track on the depicted optical disk, the computer program 747; 847 can be stored in any way which is suitable for the computer program product 747; 847. The computer program may thus be loaded into the operating memory of a computer or equivalent processing device for execution by the processing circuitry thereof.

The is also provided a carrier comprising the computer program 747; 847, wherein the carrier is one of an electronic signal, an optical signal, an electromagnetic signal, a magnetic signal, an electric signal, a radio signal, a microwave signal, or a computer-readable storage medium.

The flow diagram or diagrams presented herein may be regarded as a computer flow diagram or diagrams, when performed by one or more processors. A corresponding apparatus may be defined as a group of function modules, where each step performed by the processor 810 corresponds to a function module. In this case, the function modules are implemented as a computer program running on the processor 810.

The computer program residing in memory 820 may thus be organized as appropriate function modules configured to perform, when executed by the processor 810, at least part of the steps and/or tasks described herein.

Figure 8C:
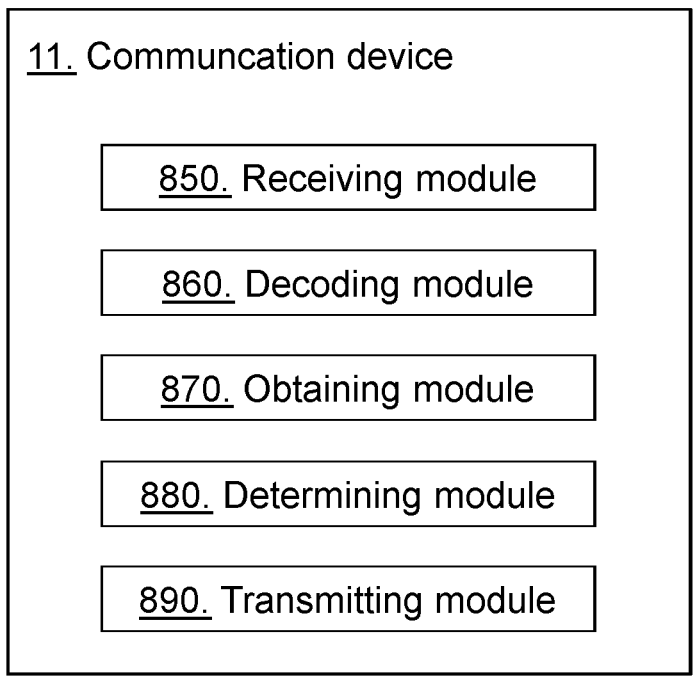
FIG. 8c illustrates schematically a communication device comprising function modules/software modules for implementing an embodiment herein.

FIG. 8c is a schematic diagram illustrating an embodiment of the communication device 11, in terms of a number of functional modules. The communication device 11 comprises:

a receiving module 850 configured to receive from an access node a first frame sequence comprising:
 a first portion comprising a first preamble associated with a first communication protocol, followed by
 a second portion comprising a first polling frame associated with the first communication protocol, and
 a third portion comprising a second preamble followed by a second polling frame, associated with a second communication protocol, said third portion being multiplexed in the frequency domain with the second portion;
a decoding module 860 configured to decode one of the first portion and the second portion of the first frame sequence;
a obtaining module 870 configured to obtain a timing indicator from the access node;
a determining module 880 configured to determine a time of transmission of a first portion of a second frame sequence based on the timing indicator; and
a transmitting module 890 configured to transmit the first portion of the second frame sequence at the determined time to the access node.

In general terms, each functional module 850-890 may be implemented in hardware or in software. Preferably, one or more or all functional modules 850-890 may be implemented by processing circuitry including at least one processor 810, possibly in cooperation with functional units 820 and/or 830. The processing circuitry may thus be arranged to fetch from the memory 820 instructions as provided by a functional module 850-890 and to execute these instructions, thereby performing any actions of the communications device 11 as disclosed herein.

Alternatively, it is possible to realize the module(s) in FIG. 8c predominantly by hardware modules, or alternatively by hardware, with suitable interconnections between relevant modules. Particular examples include one or more suitably configured processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending data and/or signals. The extent of software versus hardware is purely implementation selection.

In the following, some embodiments of the technology presented herein are exemplified. In the 802.11ax specification being developed it has been agreed that High Efficiency (HE) Protocol Data Unit (PPDU) shall include the legacy preamble (L-STF, L-LTF and L-SIG), duplicated on each 20 MHz, for backward compatibility with legacy devices. 802.11ax data transmission consist of legacy preamble transmission, followed by 802.11ax preamble (HE-SIG-A, HE-STF, HE-LTF) and data field (HE data). According to some embodiments herein, protocols, such as 802.11ax, may be further developed, by allowing narrow band operations and also including more power saving functionalities to support Internet of Things (IoT) use cases. Such an advanced protocol is herein defined as Narrowband WiFi (NB-WiFi). The above mentioned LRLP WiFi was intended to leverage the mass-market WLAN infrastructure for reliable, consistent, and stable access by operating within 2.4 GHz band. A NB-WiFi STA (NB-WiFi station) may operate in shorter channel bandwidths, e.g., 2 MHz and hence will not be able to decode the legacy 20 MHz signal. It's important to note, that a legacy 802.11 STA (e.g. 802.11ax, 802.11n etc.) operate in wider channel bandwidths, 20 MHz, and is thereby unable to decode the NB-WiFi STA transmissions. Also, NB-WiFi Access Point (AP) suitably operates in both shorter and wider channel bandwidths i.e. transmit/receives in both 20 MHz and 2 MHz. Further according to the technology presented, the NB-WiFi AP may perform Clear Channel Assessment (CCA) and legacy network access, protect the downlink narrow band transmission using legacy preambles and protect uplink narrow band transmissions using legacy preambles and trigger uplink from NB-WiFi STAs. In this case, NB-WiFi AP transmission will thus consist of legacy preamble, NB-WiFi preamble and multiuser downlink/uplink transmissions. A NB-WiFi AP as proposed, may serve both NB-WiFi and 802.11ax STAs together in both uplink and downlink, using part of the channel bandwidth allocated for NB-WiFi usage and rest for the 802.11ax STAs.

It's also worth noting that "legacy" protocols in case of NB-WiFi also includes 802.11ax along with 802.11n/ac/b.

In case of scheduling uplink transmissions among 802.11ax and NB-WiFi STAs, dual mode AP may transmit a polling frame, e.g., a Trigger Frame (TF), which has a legacy (802.11ax/n/ac/b) preamble and NB-WiFi preamble, along with corresponding uplink mapping to schedule 802.11ax and NB-WiFi STAs on respective resource blocks. This is followed by corresponding uplink transmissions by the 802.11ax and NB-WiFi STAs on their respective allocated resource blocks.

In an exemplary frame sequence, 802.11 ax and NB-WiFi transmissions is multiplexed in time and frequency. In such a frame sequence, an AP transmits Downlink (DL) triggers to schedule multiplexed 802.11ax and NB-WiFi Uplink (UL) transmission. This example will now be explained in relation to generic frame sequences 500 and 550 of FIG. 5. The frame sequence in this example starts with a first portion 510 comprising an 802.11ax preamble 510*a*. This preamble is followed by a second portion 515 and a third portion 520 802.11ax, multiplexed in frequency, comprising 802.11ax transmission and NB-WiFi transmission, respectively. The second portion 515 comprises an 802.11ax polling frame 515*a* and possibly DL data, and the third portion 520 comprises a NB-WiFi preamble 520*a* and a NB-WiFi polling frame 520*b*. When the 802.11ax transmission occupies much larger bandwidth than the NB-WiFi transmission, the 802.11ax transmission duration may be much shorter than the NB-WiFi transmission. The 802.11ax and NB-WiFi DL transmissions have to end at the same time so that the uplink transmissions can be synchronized in time, and therefore the 802.11 ax transmission may be extended by padding. Padding is however an inefficient use of bandwidth and the transmission of the padding bits may further create interference to any other simultaneous transmissions. It is therefore proposed to introduce a timing indicator, which enables the AP to control the time of reception (e.g., $t_{adj}$) of UL transmission from the STA(s). The UL frame sequence 550 starts with a first portion 560, which may comprise an 802.11ax preamble 560*a* transmitted by 802.11ax STA(s), followed by a second portion 570 comprising e.g., NB-WiFi transmission comprising a NB-WiFi preamble and payload (i.e., data) and a third portion 565 comprising 802.11ax UL payload, wherein the second and third portions are multiplexed in frequency. One or more further portions 580 may also be comprised in the UL frame sequence, comprising e.g. 802.11ax transmission data, which portion(s) are also multiplexed in frequency with the second and third portions.

The UL transmissions from 802.11ax and NB-WiFi STAs, or devices, may also start at the same time. In this case, the 802.11ax preamble and NB-WiFi transmission will be overlapped and may interfere each other. The AP has to be able to decode the signal successfully in the presence of the interference.

The multiplexing of 802.11ax and NB-WiFi transmissions can improve radio resource efficiency. In the multiplexing, the time required to transmit the same number of bits in the 802.11ax transmission may be much shorter than the NB-WiFi transmission due to the following reasons:

802.11ax transmission usually receives more bandwidth than NB-WiFi transmission.

NB-WiFi transmission may have longer range so that lower modulation and coding scheme (MCS) has to be used NB-WiFi preamble has to be transmitted after the 802.11ax preamble The conditions listed above are not always fulfilled in each multiplexing transmission, but statistically such scenario will happen with high chances.

The timing indicator may be transmitted with DL transmissions, e.g., in an 802.11ax MAC header or in payload of a control or management frame. When receiving the timing indicator, an STA will determine a time of transmission, i.e. wait a duration based on the timing indicator before starting the UL transmission.

A frame sequence of multiplexed 802.11ax and NB-WiFi transmission may thus be achieved without any padding being required as a result of the explicitly stated IFS, and thereby the interference introduced to the radio environment by the padding bits is avoided.

In another example the situation is reversed in that the second portion comprising the 802.11 ax transmission in the DL frame sequence is longer than the third portion comprising the NB-WiFi transmission.

In some embodiments of the method, the AP, by the timing indicator, indicates a Interframe Space (IFS) in each DL transmission, i.e. the time space between DL and UL transmissions, e.g., $\Delta t_{adj}$ in FIG. 5. The timing indicator may then be defined to convey the explicit IFS information. The timing indicator may, e.g., be a time duration or an index value to indicate one of several pre-indexed durations.

In some embodiments, the value of the timing indicator is not changing in the following transmissions. It may then not be necessary for the AP to provide the timing indicator for these transmissions. Instead, the communication device, e.g. the 802.11ax or NB-WiFi STA, may determine that the timing indictor is unchanged, and determine a time of transmission based on a previous timing indicator. AP may again provide the timing indicator, when it changes.

AP may indicate one or more STAs to wait before they start their uplink transmission.

AP may indicate how much time to wait for one type of STAs, using polling frame, e.g. in a MAC header or in payload of a control or management frame.

In case when 802.11ax downlink transmissions are longer than NB-WiFi transmissions, the AP may indicate to 802.11ax STAs to wait before they start their uplink transmission.

In the case, when NB-WiFi downlink transmissions are longer than 802.11ax transmissions, AP may indicate to may indicate to NB-WiFi STAs to wait before they start their uplink transmission.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method for communicating in a wireless communication network, said method performed at an access node comprising:
    obtaining a timing indicator;
    transmitting to at least one communication device a first frame sequence comprising:
        a first portioncomprising a first preamble associated with a first communication protocol;
        a second portion comprising a first polling frame, associated with the first communication protocol; and
        a third portion comprising a second preamble followed by a second polling frame, associated with a second communication protocol, the third portion being multiplexed in a frequency domain with the second portion;
    providing to the at least one communication device the timing indicator for enabling the access node to control a time of reception of a first portion of a subsequent second frame sequence from the at least one communication device; and
    receiving the first portion of the second frame sequence.

2. The method according to claim 1 wherein the second portion of the first frame sequence consists of the first polling frame.

3. The method according to claim 1 wherein the timing indicator is provided within the first frame sequence.

4. The method according to claim 3 wherein the timing indicator is provided in a Media Access Control (MAC) header.

5. The method according to claim 1 wherein the timing indicator is provided in one of a payload of a control frame, or a payload of a management frame.

6. The method according to claim 1 further comprising:
    receiving the first portion of the second frame sequence from a first communication device of the at least one communication device, wherein the first portion of the second frame sequence comprises a third preamble.

7. The method according to claim 6 further comprising:
    receiving a second portion of the second frame sequence comprising a fourth preamble from a second communication device of the at least one communication device, wherein the time of reception of the second portion of the second frame sequence is controlled by a preconfigured value.

8. The method according to claim 7 wherein the first portion of the second frame sequence is received prior to receiving the second portion of the second frame sequence.

9. The method according to claim 8 wherein the third preamble is associated with the first communication protocol and the fourth preamble is associated with the second communication protocol.

10. The method according to claim 9 wherein the second portion of the second frame sequence comprises user data.

11. The method according to claim 8 further comprising receiving a third portion of the second frame sequence comprising user data from the first communication device, wherein the third portion of the second frame sequence is multiplexed with the second portion of the second frame sequence in the frequency domain.

12. The method according to claim 7 wherein the first portion of the second frame sequence is received subsequently to receiving the second portion of the second frame sequence.

13. The method according to claim 12 wherein the third preamble is associated with the second communication protocol and the fourth preamble is associated with the first communication protocol.

14. The method according to claim 13 wherein the first portion of the second frame sequence comprises user data.

15. The method according to claim 12 further comprising receiving a third portion of the second frame sequence comprising user data from the second communication device, wherein the third portion of the second frame sequence is multiplexed with the first portion of the second frame sequence in the frequency domain.

16. A method for communicating in a wireless communication network, said method comprising performed at a communication device comprising:
    receiving from an access node a first frame sequence comprising
        a first portion comprising a first preamble associated with a first communication protocol; and
        a second portion comprising a first polling frame associated with the first communication protocol; and
        a third portion comprising a second preamble followed by a second polling frame, associated with a second communication protocol, the third portion being multiplexed in a frequency domain with the second portion;
    decoding one of the first portion and the third portion of the first frame sequence;
    obtaining a timing indicator from the access node;
    determining a time of transmission of a first portion of a subsequent second frame sequence based on the timing indicator; and
    transmitting the first portion of the second frame sequence at the determined time to the access node.

17. The method according to claim 16 wherein obtaining the timing indicator comprises extracting the timing indicator from the first frame sequence.

18. The method according to claim 17 wherein the timing indicator is provided in a Media Access Control (MAC) header.

19. The method according to claim 18 wherein obtaining the timing indicator comprises extracting the timing indicator from one of a payload of a control frame, or a payload of a management frame.

20. The method according to any of claim 16 wherein the first portion (560; 670) of the second frame sequence comprises a third preamble.

21. The method according to claim 20 further comprising decoding the first portion of the first frame sequence and wherein the third preamble is associated with the first communication protocol.

22. The method according to claim 20 further comprising decoding the third portion of the first frame sequence and wherein the third preamble is associated with the second communication protocol.

23. An access node for communicating in a wireless communication network, wherein said access node comprising:
a processor; and
a memory containing instructions which, when executed by the processor, cause the access node to perform operations to:
obtain a timing indicator;
transmit to at least one communication device a first frame sequence comprising:
a first portion comprising a first preamble associated with a first communication protocol;
a second portion comprising a first polling frame associated with the first communication protocol; and
a third portion comprising a second preamble followed by a second polling frame, associated with a second communication protocol, the third portion being multiplexed in a frequency domain with the second portion;
provide to the at least one communication device the timing indicator for enabling the access node to control a time of reception of a first portion of a second frame sequence from the at least one communication device; and
receive the first portion of the second frame sequence.

24. A communication device for communicating in a wireless communication network, wherein said communication device comprising:
a processor; and
a memory containing instructions which, when executed by the processor, cause the communication device to perform operations to:
receive from an access node a first frame sequence comprising:
a first portion comprising a first preamble associated with a first communication protocol;
a second portion comprising a first polling frame associated with the first communication protocol; and
a third portion comprising a second preamble followed by a second polling frame, associated with a second communication protocol, the third portion being multiplexed in a frequency domain with the second portion;
decode one of the first portion and the second portion of the first frame sequence;
obtain a timing indicator from the access node;
determine a time of transmission of a first portion of a second frame sequence based on the timing indicator; and
transmit the first portion of the second frame sequence at the determined time to the access node.

25. A non-transitory computer readable storage medium containing instructions which, when executed by a processor of an access node, are capable of causing the access node to perform operations for communicating in a wireless communication network comprising:
obtaining a timing indicator;
transmitting to at least one communication device a first frame sequence comprising:
a first portion comprising a first preamble associated with a first communication protocol;
a second portion comprising a first polling frame, associated with the first communication protocol; and
a third portion comprising a second preamble followed by a second polling frame, associated with a second communication protocol, the third portion being multiplexed in a frequency domain with the second portion;
providing to the at least one communication device the timing indicator for enabling the access node to control a time of reception of a first portion of a subsequent second frame sequence from the at least one communication device; and
receiving the first portion of the second frame sequence.

26. A non-transitory computer readable storage medium containing instructions which, when executed by a processor of a communication device, are capable of causing the communication device to perform operations for communicating in a wireless communication network comprising:
receiving from an access node a first frame sequence comprising
a first portion comprising a first preamble associated with a first communication protocol;
a second portion comprising a first polling frame associated with the first communication protocol; and
a third portion comprising a second preamble followed by a second polling frame, associated with a second communication protocol, the third portion being multiplexed in a frequency domain with the second portion;
decoding one of the first portion and the third portion of the first frame sequence;
obtaining a timing indicator from the access node;
determining a time of transmission of a first portion of a subsequent second frame sequence based on the timing indicator; and
transmitting the first portion of the second frame sequence at the determined time to the access node.

* * * * *

UNITED STATES PATENT AND TRADEMARK OFFICE
CERTIFICATE OF CORRECTION

| | |
|---|---|
| PATENT NO. | : 11,076,423 B2 |
| APPLICATION NO. | : 16/624890 |
| DATED | : July 27, 2021 |
| INVENTOR(S) | : Wang et al. |

It is certified that error appears in the above-identified patent and that said Letters Patent is hereby corrected as shown below:

In the Specification

In Column 6, Lines 64-65, delete "obtains a timing indicator obtains a timing indicator." and insert -- obtains a timing indicator. --, therefor.

In Column 7, Line 23, delete "embodiment, of" and insert -- embodiment of --, therefor.

In Column 7, Line 60, delete "Action 360" and insert -- Action S360 --, therefor.

Figure 4:
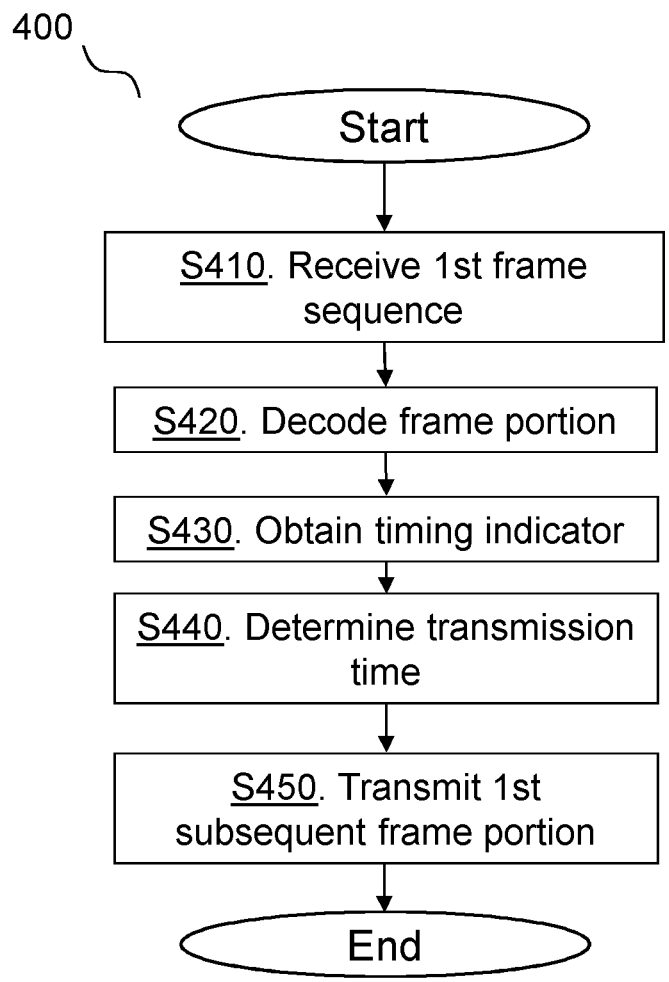
FIG. 4 is a flowchart depicting a method performed by a communication device according to particular embodiments herein.

In Column 8, Line 17, delete "FIG. 4A." and insert -- FIG. 4. --, therefor.

In Column 10, Line 61, delete "memory 720" and insert -- memory 820 --, therefor.

In Column 11, Line 1, delete "S410-450," and insert -- S410-S450, --, therefor.

In Column 11, Line 31, delete "computer program 837," and insert -- computer program 847, --, therefor.

In Column 11, Lines 34-35, delete "computer program 837." and insert -- computer program 847. --, therefor.

In Column 13, Line 13, delete "Protocol Data Unit (PPDU)" and insert -- Physical Protocol Data Unit (PPDU) --, therefor.

In Column 15, Line 10, delete "timing indictor" and insert -- timing indicator --, therefor.

In Column 15, Lines 23-24, delete "may indicate to may indicate to NB-WiFi" and insert -- may indicate to NB-WiFi --, therefor.

Signed and Sealed this
Tenth Day of May, 2022

Katherine Kelly Vidal
*Director of the United States Patent and Trademark Office*

CERTIFICATE OF CORRECTION (continued)
U.S. Pat. No. 11,076,423 B2

In the Claims

In Column 15, Line 41, in Claim 1, delete "portioncomprising" and insert -- portion comprising --, therefor.

In Column 16, Line 47, in Claim 16, delete "method comprising performed" and insert -- method performed --, therefor.

In Column 16, Line 52, in Claim 16, delete "protocol; and" and insert -- protocol; --, therefor.

In Column 17, Line 11, in Claim 20, delete "The method according to any of claim" and insert -- The method according to claim --, therefor.

In Column 17, Line 12, in Claim 20, delete "portion (560; 670) of" and insert -- portion of --, therefor.